US012702085B2

(12) United States Patent
Cordeiro et al.

(10) Patent No.: US 12,702,085 B2
(45) Date of Patent: Aug. 11, 2026

(54) LASER SYSTEM FOR AGRICULTURAL USE

(71) Applicants: Luiz Alexandre Cordeiro, Lapa (BR); Guilherme Dutra, Curitiba (BR)

(72) Inventors: Luiz Alexandre Cordeiro, Lapa (BR); Guilherme Dutra, Curitiba (BR)

(*) Notice: Subject to any disclaimer, the term of this patent is extended or adjusted under 35 U.S.C. 154(b) by 759 days.

(21) Appl. No.: 18/002,725

(22) PCT Filed: Jul. 6, 2020

(86) PCT No.: PCT/BR2020/050247

§ 371 (c)(1),
(2) Date: Dec. 21, 2022

(87) PCT Pub. No.: WO2022/006643

PCT Pub. Date: Jan. 13, 2022

(65) Prior Publication Data

US 2023/0309444 A1 Oct. 5, 2023

(51) Int. Cl.

| | |
|---|---|
| ***A01D 34/01*** | (2006.01) |
| ***A01D 34/00*** | (2006.01) |
| ***A01M 1/22*** | (2006.01) |
| ***A01M 21/04*** | (2006.01) |

(52) U.S. Cl.

CPC ......... *A01D 34/015* (2013.01); *A01D 34/008* (2013.01); *A01D 34/01* (2013.01); *A01M 1/22* (2013.01); *A01M 21/04* (2013.01)

(58) Field of Classification Search

CPC ........... A01G 3/08; A01M 21/04; A01M 1/22; A01D 34/008; A01D 34/015; A01D 34/01

See application file for complete search history.

(56) References Cited

U.S. PATENT DOCUMENTS

| | | | | |
|---|---|---|---|---|
| 3,652,844 A * | 3/1972 | Scott, Jr. | ............ | B23K 26/0006 47/DIG. 6 |
| 5,915,949 A | 6/1999 | Johnson | | |
| 6,269,617 B1 | 8/2001 | Blanchard | | |
| 6,374,584 B1 | 4/2002 | Blanchard | | |
| 6,443,365 B1 * | 9/2002 | Tucker | ................. | B05B 12/122 239/69 |

(Continued)

FOREIGN PATENT DOCUMENTS

| | | |
|---|---|---|
| CN | 101589705 B | 6/2011 |
| CN | 110326444 A | 10/2019 |
| EP | 2848119 A1 | 3/2015 |

*Primary Examiner* — Adam J Behrens

(74) *Attorney, Agent, or Firm* — Calderon Safran & Wright PC; Corinne Marie Pouliquen

(57) ABSTRACT

A laser system for agricultural applications, the purpose of which is to broaden, supplement or replace the functions performed by conventional implements, aimed at performing pruning, harrowing, cutting, drying and photostimulation, by means of one or more lasers, with a power-supply module, control module, compressed gas and/or ventilation module, temperature control module, distribution module, laser module, laser light containment and guidance module and wheels, having the advantages of reduced dimensions and weight, being able to move at relatively high speeds with low fuel consumption and low operating costs, being able to operate or not operate in environments with positive pressure to avoid damage to the optical parts or along the path of the laser, the modularity of the system and its adaptability to any size of field.

6 Claims, 8 Drawing Sheets

(56) References Cited

U.S. PATENT DOCUMENTS 6,795,568 B1 * 9/2004 Christensen .......... A01M 21/04
382/110
6,834,483 B2 * 12/2004 Harvey ................ A01D 34/015
56/1
7,081,611 B2 * 7/2006 Scott .................. G01N 21/3151
250/221
7,875,862 B1 * 1/2011 Hudson ................. A01M 21/04
250/492.1
8,027,770 B2 * 9/2011 Poulsen ................ A01M 21/04
701/50
9,374,990 B2 6/2016 Bolen
9,609,858 B2 * 4/2017 Stowe .................... G01N 21/29
10,269,107 B2 * 4/2019 Jackson ............... G06V 10/143
10,548,306 B2 * 2/2020 Albert ..................... A01M 7/00
11,350,622 B2 * 6/2022 Redden ............... A01M 21/046
2010/0215222 A1 * 8/2010 Zeelen ..................... A01G 3/00
382/110
2011/0211733 A1 * 9/2011 Schwarz .............. A01B 79/005
382/110
2015/0075068 A1 * 3/2015 Stowe .................. A01D 43/003
56/229
2016/0050852 A1 * 2/2016 Lee .......................... B25J 9/023
901/41
2018/0139947 A1 * 5/2018 Albert ..................... A01M 7/00
2018/0240228 A1 * 8/2018 Jackson ................. H04N 23/63
2019/0075732 A1 * 3/2019 Gowa .................. A01B 69/008
2020/0120917 A1 * 4/2020 Jackson ................ A01M 21/04
2021/0076662 A1 * 3/2021 Mikesell ............... A01M 21/04
2021/0092891 A1 * 4/2021 Grant .................. A01M 21/043
2021/0176981 A1 * 6/2021 Correns ................ A01M 29/00
2023/0292736 A1 * 9/2023 Mikesell ................... G06T 7/70
348/142
2024/0041018 A1 * 2/2024 Mikesell ................. G01P 15/08

* cited by examiner

LASER SYSTEM FOR AGRICULTURAL USE

CROSS-REFERENCE TO RELATED APPLICATIONS AND CLAIM TO PRIORITY

This application is a national stage application of International Application No. PCT/BR2020/050247 filed Jul. 6, 2020, the disclosure of which is incorporated herein by reference and to which priority is claimed.

FIELD OF THE INVENTION

The present utility patent refers to a laser system for agricultural use applied in the field of agricultural production, with the purpose of amplifying, complementing or substituting the functions performed by traditional implements, such as brush cutters and harvesters, as well as pesticides and/or desiccants used in the control and elimination of weeds and pests of cultivated plants, and also in the stimulation of the growth or the production of cultivars, aiming at pruning, weeding, cutting, desiccation, photostimulation, among others, in crops in general such as, but not limited to, soybeans, corn, cotton, sugar cane and beans, having as an advantage the reduced dimensions and weight of the system, its movement can occur at relatively high speeds with low fuel consumption and low operating costs, the optical devices may or may not operate in environments with positive pressure to avoid damage due to dust or organic matter residues that could accumulate on the optical parts or along the laser path, modularity of the system and adaptability for all crop sizes.

BACKGROUND OF THE INVENTION

As is common knowledge in technical means related to agricultural production and control, the following means are currently available:

- Cutting: action of segmenting the organic material into one or more parts, such as leaves, stems, grains, fruits, roots, and other plant structures, by means of cutting processes with or without thermal effects, depending on the functionality of the process, for example, the cutting of the base of the plant stem in the harvesting process using cutting platforms in harvesters.
- Pruning: cutting of specific structures of the plants, such as leaves and the apical region, in this case it is called removal of the apical meristem, with control of the vertical position from the ground, with the function of promoting the stoppage of the development of the central structures to stimulate the development and production of lateral and lower branches, thus increasing the production of the plant. In this case, cutting processes are used, preferably with thermal effects, to promote the removal of the parts of interest and at the same time provide the cauterization of the plant preventing its weakening through the ingress of diseases in unprotected regions.
- Weeding: cleaning between plants, in the same or different plant bed rows, with the aim of cutting, burning and/or eliminating invasive species and weeds present in the crops. In this case, cutting processes are used, with or without thermal effect, and/or dehydration to promote desiccation and subsequent extinction and/or reduction of invasive species.
- Desiccation: Extermination of weeds and pests in preplanting, before closing the rows, in pre-harvest, or at any other opportune moment. Desiccation of green stems to standardize the maturation of plants for harvesting. Desiccation to anticipate harvest and improve seed quality.
- Photostimulation: photochemical effect (photostimulation), to change the cellular metabolism and/or the morphology of the plant, promoting biomodulation of the plant, for example, soybeans, corn, cotton, sugar cane, beans, among others, including vegetables and activities in vertical farms.

The use of lasers in agriculture has been studied for years by the scientific community with examples of applications in several areas.

Searching the Brazilian and international patent databases, we found the following revelations:

U.S. Pat. No. 3,652,844A which discloses a laser system for selective eradication of plants on land or water. The invention can be mounted for use on boats, aircraft or land vehicles, and although it has been described for weeding in water, the invention can also be used in weed control operations in waterways, along roads, on railroads or transmission lines, on access roads or residential or agricultural areas. The goal is to eliminate weeds without using chemicals. Basically, the system consists of a laser and a set of mirrors that diverge the laser beam to align it with the desired target. The laser beam can be emitted horizontally or vertically. The laser used will depend on the application. The paper cites the N2-CO2-He laser (650 W output) for eliminating emerging and floating aquatic plants.

U.S. Pat. No. 9,609,858B2 discloses a system for removing unwanted plants using variable optics. The system consists of an image generator, an image processor, a laser device, and a guidance system. The system can be installed on a tractor. The invention is aimed at removing unwanted plants or weeds with the use of a laser beam. Basically, the system identifies the unwanted plant by means of image recognition and positions multiple laser beams on it. The document points out that the most effective position for laser destruction of a weed or unwanted plant is the meristem region. It further points out that typical unwanted plants or weeds have a target meristem region of around 1 mm or less available for laser destruction to stop growth. As an unwanted plant grows, more energy is required for effective destruction. The paper reveals that a CO2 laser can be used for this application. The power output of the laser can vary depending on the size of the plant, for larger plants, the greater the power and exposure time to destroy it.

U.S. Pat. Nos. 6,269,617B1 and 6,374,584B1 disclose a laser lawn mowing system. The objective of the documents is to replace cutting blades with a laser system for cutting vegetation, with options to regulate cutting height and speed. In document U.S. Pat. No. 6,269,617B1, the system consists of a rotating laser beam generator, with one or more laser beams with an adjustable angle. Control of rotation and cutting height is controlled via a user interface. The system can be adapted on a tractor, car or portable equipment. In the second document, U.S. Pat. No. 6,374,584B1, the system has a fixed laser. The emitted beam is divided into several optical paths by means of mirrors, making several cutting lines. The system is installed internally on an apparatus with two optical beam protection walls. The cutting system is powered by a tractor. In both documents no laser type, power or wavelength is specified that can be used for cutting vegetation.

U.S. Pat. No. 5,915,949A discloses a method and system for laser pest control. The invention uses a laser to exterminate pests hidden behind or inside a solid. The proposal is to exterminate the pest without damaging the barrier. The method can be used to control ant and termite infestation of common household building materials and to control agricultural pests in crop fields. A specific method of the invention involves repetitive scanning of a location frequented by pests using an automated laser scanning system. This can provide continuous pest control in an infested area without the use of mechanical traps or chemicals and without the need for a human operator. The proposed system consists of a source of a laser beam capable of killing or harming the pest, a scanner capable of directing the laser beam produced by the source within a scanned area to locate the pest, and a disposable attractant to lure the pests into the scanned area. The document points out that this modality is best suited for use in remote areas, so that accidental exposure to a human or animal can be avoided. The document reveals that for the proposed system, one can use CO2, Nd-YAG, Nd-glass, helium-neon, ruby, aluminum gallium arsenide, dye, helium and cadmium, argon laser, krypton, or KTP-YAG lasers. The document further points out that wavelengths for these known lasers range from about 0.4 to 10.6 microns, but wavelengths outside this range, for example all infrared, visible light, and ultraviolet, can also be employed. As for laser power, the document discloses that depending on the type of pest, the power level of the laser source should be at least 2 watts for animals such as rodents, and at least about 0.1 watt for insects and other small or microscopic creatures.

U.S. Pat. No. 9,374,990B2 discloses a laser method and system for laser pest control. The system proposes to replace conventional methods for pest control, such as insecticides, electric traps, and others. The system has a housing, with perforated side walls and inside the housing a laser. When the insect enters the perforated walls, it is hit by a laser beam. The paper reveals that several types of lasers can be used, such as: CO2, Nd-YAG, Nd-glass, helium-neon, ruby, aluminum gallium arsenide, dye, helium-cadmium laser, argon, krypton or KTP-YAG. Wavelengths for these known lasers range from about 0.4 to 10.6 microns, but wavelengths outside this range, like all infrared, visible and ultraviolet light, can also be employed. The document also points out that either continuous or pulsed lasers can be used.

U.S. Pat. No. 6,834,483 discloses a method of harvesting sugar cane or other plants, such as corn, by using one or more lasers. The method has the advantage of replacing conventional cutting blades with laser systems. In the cutting process using blades, when the stalks are cut, they are exposed to bacteria, due to the glucose in the sugar cane. With the use of lasers, at the time of cutting, the laser beam interacts with the organic material and the stalk is cauterized. In this way, there is no contamination by bacteria. For this invention, the laser system can be installed in a vehicle with tires, where the laser system can be powered by a generator. The laser system comprises one or more lasers, a cutting mechanism containing a camera, an ultrasonic control, and a controlled radar. In the document, it is pointed out that the laser beam needs to be focused. However, the document does not say which laser can be used for the cutting process.

U.S. Pat. No. 7,875,862 discloses a laser system with ultraviolet beams for weed eradication. The emission band of the lasers is controlled according to the plant to be eradicated. The system consists of at least one ultraviolet laser, a power supply for the laser, a cooler for the laser, and when necessary, a computer. The advantage of the system is that you can select an ultraviolet emission band to eliminate only the desired plant, without damaging the other plants around. Furthermore, the system can be used in aerial vehicles or ground vehicles, where the laser system can be fixed or rotating. The document points out that the wavelength of the ultraviolet laser must be below 400 nm and above 200 nm, within this range, the length is adjusted according to the plant to be exterminated.

US patent US2016050852A1 discloses an agricultural robot system that enables quick and hygienic cutting of peduncle or thin flowers, for example for harvesting, thinning fluids, thinning flowers, such as strawberry, grape, tomato, cherry, and others. The system presents as an advantage the substitution of manual cutting work by a robot system. The system is composed of: a laser beam, a galvanometer scanner system set up to perform a cutting or thinning job, cameras to record the processing, and an image recognition unit to run or stop the processes. The document does not reveal which laser or wavelength can be used for the cutting or thinning processes.

Chinese patent CN101589705B discloses a laser robot system for weeding out unwanted plants. The system is composed of an autonomous vehicle, which can run in a field, for example. The document cites the use of a laser diode but does not reveal the wavelength of the laser that is suitable for the application. The laser beam is guided by mirrors with angles that are adjusted according to the height of the cut.

Chinese patent CN110326444A discloses a system for pruning plants by using a laser beam. The system can be used on an aerial vehicle. The document does not disclose the type of laser that can be used.

Current solutions have disadvantages, limitations, and drawbacks as they have low speed, high fuel consumption, and high operating costs. All the optical devices may or may not operate in environments with positive pressure to avoid damage due to dust or organic matter residues that could accumulate on the optical parts or along the laser path; lack of modularity of the system and the system may not be adaptable for all crop sizes.

SUMMARY OF THE INVENTION

The "LASER SYSTEM FOR AGRICULTURAL APPLICATIONS", object of the present patent, was developed to overcome the limitations, inconveniences and disadvantages of the current sterilizers, through the innovative construction of one or more lasers, operating autonomously or in a controlled way that has the objective of carrying out pruning, weeding, cutting, desiccation, photostimulation, among others, in crops in general such as, but not limited to, soybeans, corn, cotton, sugar cane and beans. The advantages are the reduced dimensions and weight of the system, its movement can occur at relatively high speeds with low fuel consumption and low operational costs, the optical devices may or may not operate in environments with positive pressure to avoid damage due to dust or organic matter residues that could accumulate on the optical parts or along the laser path, modularity of the system and adaptability for all crop sizes.

Considering the patents disclosed in the state of art, below are comparative assessments of existing solutions relative to the proposal presented in this patent:

The system, object of the present patent, presents advantages in relation to the system proposed in document U.S. Pat. No. 3,652,844A, because other than eliminating weeds or other pests, it can be easily adapted for pruning, weeding, cutting, desiccation, photo-stimulation, among others. Besides that, the proposed system includes more than one laser option, for example: solid-state lasers, with semiconductors or crystals, such as Nd: YAG, gas lasers, such as CO and CO2, fiber optics, employing dopants such as Erbium, Ytterbium and Holmium, or non-linear effects, among others.

The system, object of the present patent, presents advantages because it solves other functions that the document U.S. Pat. No. 9,609,858B2 proposes with the use of variable optics for plant control, operating on a towed platform. The proposed system can operate in several ways, such as in an autonomous or controlled manner, and can be manned or unmanned, on a portable equipment, mobile platform, self-propelled or towed by a vehicle, such as a tractor, for example, or manually. Besides this, the proposed system presents several laser options and modes of operation of the lasers.

The system, object of the present patent, presents advantages because it solves other cutting functions, besides lawn cutting, as presented in documents U.S. Pat. No. 6,269,617B1 and U.S. Pat. No. 6,374,584B1. In both documents, the type of laser that can be used is not presented. In addition, the documents are limited in systems with manual or towed operation by a vehicle. In the system proposed in this patent, the laser system can be used for several functions such as: pruning, weeding, cutting, desiccation, photostimulation, among others. It also presents several laser operation options.

The system, object of the present patent, presents advantages and improvements over the one proposed in documents U.S. Pat. Nos. 5,915,949A and 9,374,990B2, because it presents several options of lasers and laser operation control, which can contribute to the development of insect control systems and methods.

The system, object of the present patent, presents advantages and improvements in relation to the system proposed in document U.S. Pat. No. 6,834,483, because the system is in the form of modules, which makes it a system that easily allows the use for several different applications besides cutting plants, such as weeding, pruning, among others. In addition, the proposed system offers a diversity of laser options for various application processes, and also, the proposed system can be operated in an autonomous or controlled manner, and can be manned or unmanned, on a portable equipment, mobile platform, self-propelled or towed by a vehicle, such as a tractor, or manually. Finally, there is no need to use only focused beams, as collimated beams can also be used.

The system, object of the present patent, presents advantages and improvements over the system proposed in document U.S. Pat. No. 7,875,862, because it presents a system composed of modules that facilitates the use in different applications. For this, it is only necessary to replace the laser module and mirrors. This way, the proposed system is not limited only to the eradication of plants.

The system, object of the present patent, presents advantages and improvements over the system proposed in document US2016050852A1, because besides cutting, the system in the form of modules can be adapted to other functions such as: pruning, weeding, desiccation, photostimulation, among others. The proposed system can also be easily installed on a robot system.

The system, object of this patent, has advantages and improvements over the system proposed in document CN101589705B, because it performs other functions besides weeding, such as pruning, cutting, desiccation, photostimulation, among others. Moreover, it presents as an advantage the extension area that the system can weed, i.e., it is possible to cover a large area with a larger number of lasers, resulting in increased speed and shorter working time.

The system, object of the present patent, presents advantages and improvements in relation to the system in document CN110326444A, because the system covers a larger pruning area than the referenced document, and the system can be used for other functions besides pruning. The referenced document also does not detail which types of lasers and wavelength can be used.

Technical problems that currently exist and how the invention of the present patent solved them:

a) The current systems are limited to eliminating only weeds or other pests, solved by the present invention that can be easily adapted to perform pruning, weeding, mowing, desiccation, photostimulation, among others.

b) The current systems operate with a limited number of operating platforms, solved by the present invention through the proposed system that can operate in several ways, such as autonomous or controlled, and can be manned or unmanned, in a portable equipment, mobile platform, self-propelled or towed by a vehicle, such as a tractor, for example, or manual.

c) The current systems operate in a limited form of operational functions, solved by the present invention, as it presents several options of lasers and control of laser operation, in addition to eliminating weeds or other pests, and can collaborate in the development of insect control systems and methods.

d) Current systems operate in a limited form of laser options, solved by the present invention, as it covers more than one laser option, for example: solid state lasers, with semiconductors or crystals, such as Nd: YAG, gas lasers, such as CO and CO2, fiber optics, employing dopants such as Erbium, Ytterbium and Holmium, or non-linear effects, among others.

e) Current systems operate at low speeds and consequently low productivity, solved by the present invention through the use of smaller platforms for multipurpose operation.

f) Current systems do not operate in positive pressure environments, with damage occurring as a result of dust or organic matter residues that could accumulate on the optical parts or along the laser path, solved by the present invention which adopts positive pressure using inert gas, such as nitrogen, or air.

BRIEF DESCRIPTION OF THE DRAWINGS

For better understanding of the present invention the following drawings are attached.

DETAILED DESCRIPTION OF THE PREFERRED EMBODIMENT(S)

Figure 1:
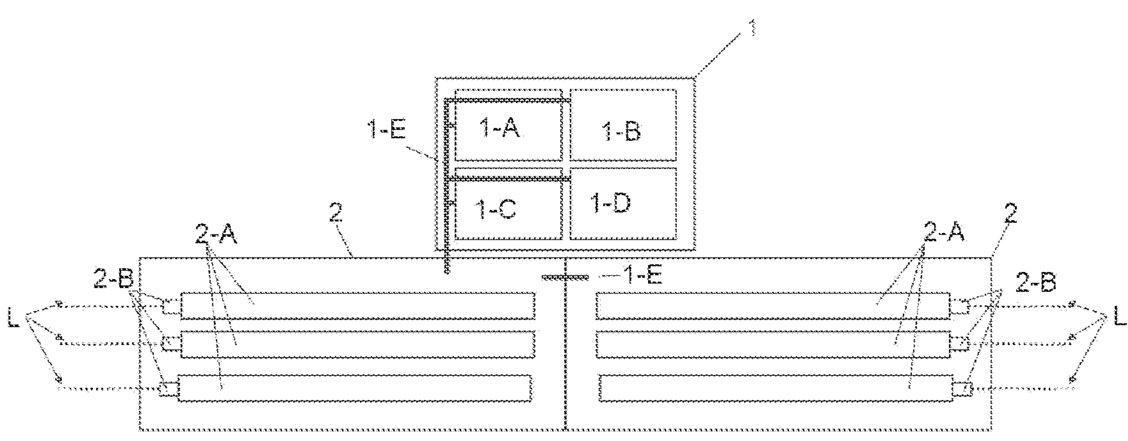
FIG. 1, which shows one of the possible schematic configurations for the mobile laser system proposed in the present invention.
Figure 2:
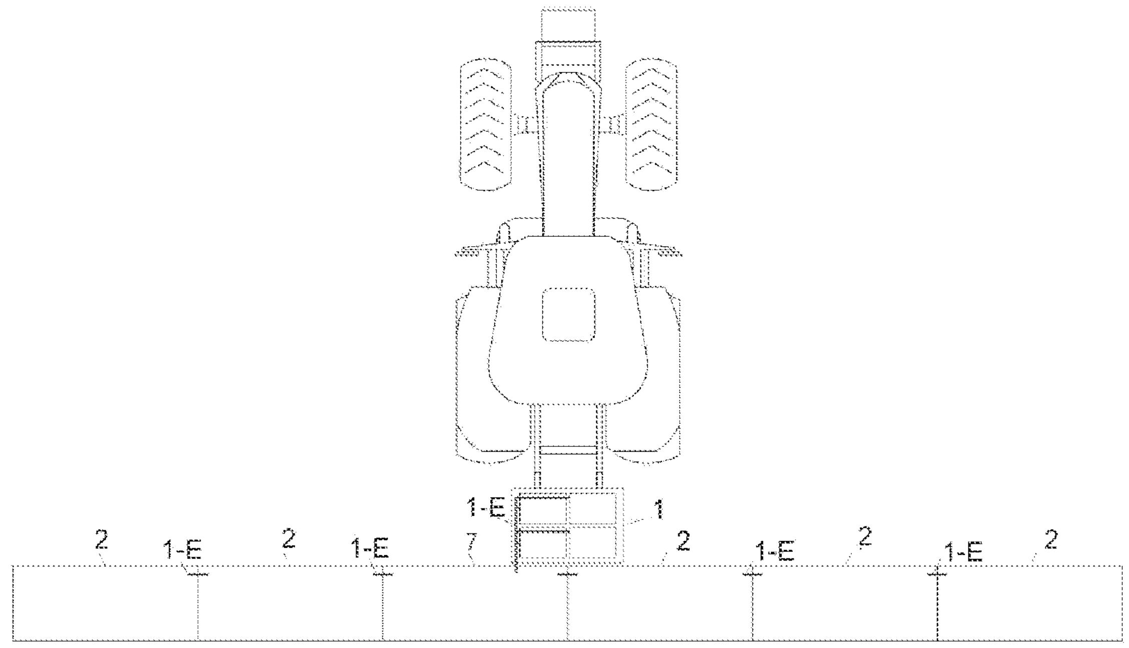
FIG. 2, which shows one of the possible schematic configurations for an example of application of the mobile laser system on a tractor and of the modularity of the system.
Figure 3:
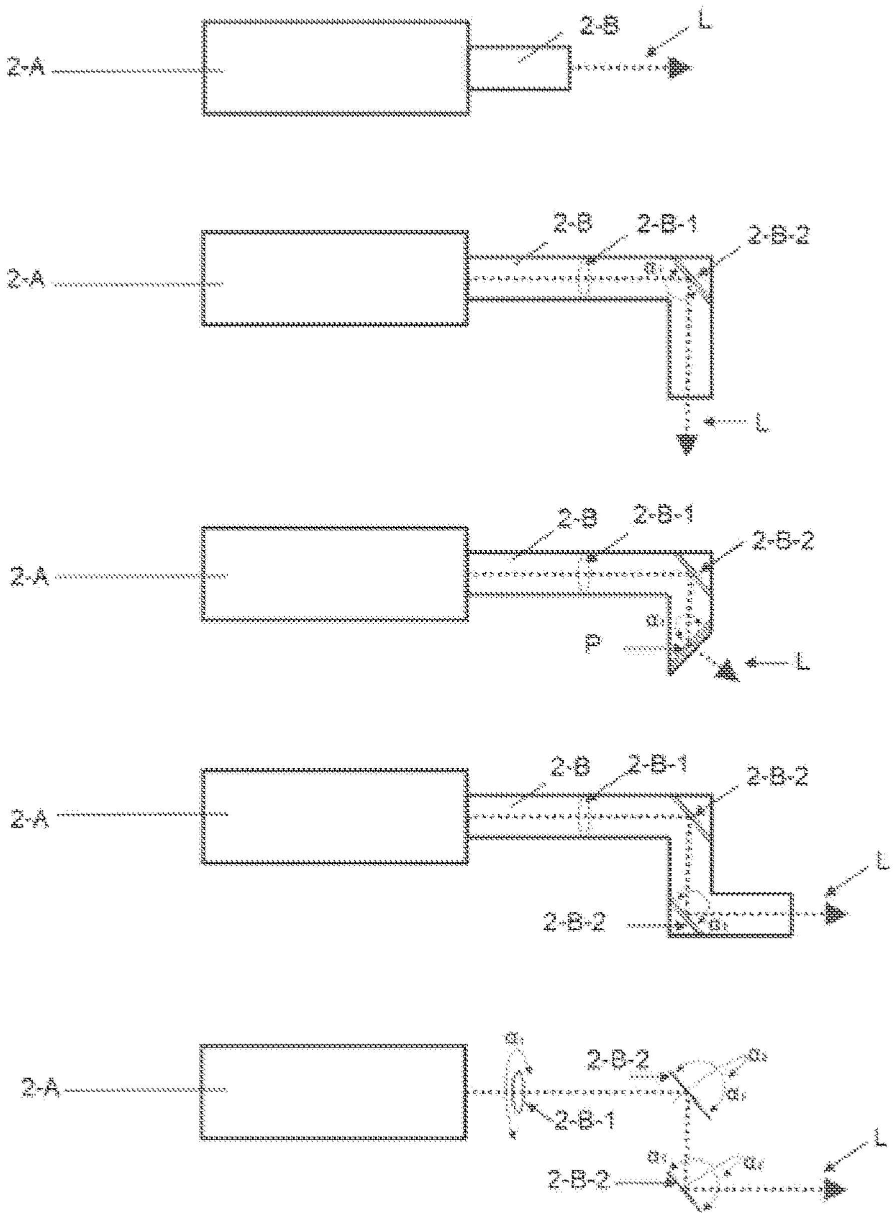
FIG. 3, which shows one of the possible schematic configurations for emission of the laser beam applied to the system proposed in the present invention.
Figure 4:
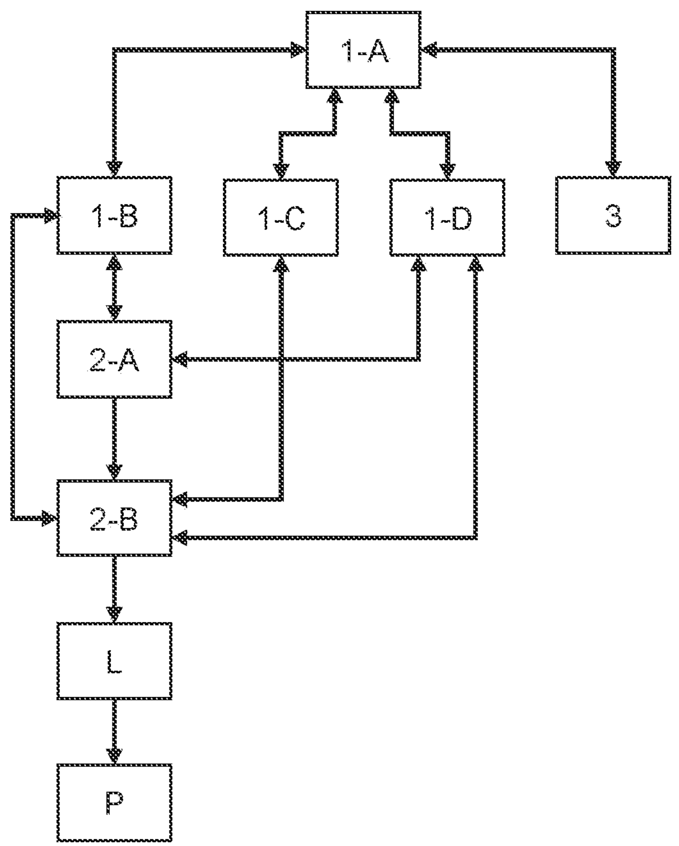
FIG. 4, which shows a flowchart of the existing connections between the modules.

According to the aforementioned figures, the system of the present patent comprises a main module (1) equipped with a power supply module (1-A) comprising a dedicated combustion electric generator, an electric generator connected to the power take-off, or auxiliary shaft, of the towing vehicle, a battery bank or, further, photovoltaic system, filters, rectifiers, fuses, circuit breakers, residual circuit breakers, surge protection devices, frequency inverters, among other components and power protection and control systems, besides cables and connections, and connected bidirectionally to modules (1-B, 1-C, 1-D and 3); control module (1-B) consisting of controllers for operation regime, trip, current, voltage, power, polarization, focus, frequency, bandwidth, wavelength, among others, and connected bidirectionally to modules (2-A, 2-B); compressed gas and/or ventilation module (1-C) consisting of compressor, reservoir, filter, dryer, pressure gauge, electrical and gas connections, among other devices, and connected bidirectionally to module (2-B); temperature control module (1-D) consisting of the compressor, condenser, evaporator, heat exchanger, expansion valve, ventilation system, thermoelectric pads, among others, and bidirectionally connected to modules (2-A and 2-B); distribution module (1-E) consisting of a set of cables, hoses, among others, and bidirectionally connected to modules (1, 2, 2-A, 2-B, and 3); secondary module (2), with magnifying capability in a long structure articulated between modules, provided with laser module (2-A), with magnifying capability for several modules in the same secondary module (2), consisting of solid state light emitting instrument with semiconductors or crystals, such as Nd: YAG, gas, such as CO and CO2, fiber optics, employing dopants such as Erbium, Ytterbium and Holmium or non-linear effects or the like and unidirectionally connected to the module (2-B); confinement module and laser light guidance (2-B) consisting of refractive elements (2-B-1) and mirrors (2-B-2) with options of arrangements, which may have up to 6 degrees of freedom each, 3 linear and 3 rotational, and directs the laser emission (L) to the plant (P) through straight edges emitting at 0 degrees, in “L-shaped” emitting at 90 degrees, in “L-shaped” emitting at any angle $\alpha 1$ (alpha1), in “Z-shaped” emitting at any angle $\alpha 1$ (alpha1), and also with other shapes given by angles $\alpha 1$ (alpha1) and $\alpha 2$ (alpha2); user protection module (2-C) consisting of plates made of acrylic material, glass, metal, wood, or a combination of these, provided they are barriers to the laser light in question; and positioning wheels (3) consisting of horizontal, vertical, and rotational positioners, distance detectors, and manual and/or automatic mono, bi, and tri-axial positioning controllers.

The constructive configuration for plant cutting (P) consists of a main module (1) with supply module (1-A), control module (1-B), with compressed gas and/or ventilation module (1-C), with temperature control module (1-D) and with distribution module (1-E), secondary module (2) that can be in the quantity that fits the application and articulated among themselves to conform to the application terrain, with laser modules (2-A), positioned on a mechanical structure and that may be in various quantities in the same secondary module (2) to increase the efficiency of the process, with a confinement module and laser light guidance (2-B) individually positioned at any angle of interest in relation to the plant beds, and composed of refractive elements (2-B-1) and mirrors (2-B-2), with each element being fixed or mobile, and with a user protection module (2-C); and positioning wheels (3) mono, bi, and tri-axial.

The constructive configuration for pruning plants (P), especially soybeans and beans, but not limited to them, has a main module (1) with supply module (1-A), control module (1-B), with compressed gas and/or ventilation module (1-C), with temperature control module (1-D) and with distribution module (1-E); secondary module (2) that can be in the quantity that suits the application and articulated among themselves to conform to the application terrain, with laser modules (2-A), positioned on a mechanical structure and can be in varied quantities in the same secondary module (2) to increase the efficiency of the process, with individual confinement module and laser light guidance (2-B) positioned at any angle of interest relative to the plant beds and consisting of refractive elements (2-B-1) and mirrors (2-B-2), with each element being able to be fixed or mobile, and with user protection module (2-C) and positioning wheels (3) mono, bi, tri-axial.

The constructive configuration for plant (P) and weed (ED) weeding has a main module (1) with supply module (1-A), control module (1-B), with compressed gas and/or ventilation module (1-C), with temperature control module (1-D) and with distribution module (1-E); secondary module (2) that can be in the quantity that suits the application and articulated among themselves to conform to the application terrain, with laser modules (2-A), positioned on a mechanical structure and can be in varied quantities in the same secondary module (2) to increase the efficiency of the process, with individual confinement module and laser light guidance (2-B), positioned at any angle of interest in relation to the plant beds, and to the weeds (ED) and consisting of refractive elements (2-B-1) and mirrors (2-B-2), with each element being able to be fixed or mobile, and with user protection module (2-C) and positioning wheels mono, bi, tri-axial (3).

The constructive configuration for desiccation of plants (P) and weeds (ED) has a main module (1) with supply module (1-A), control module (1-B), with compressed gas and/or ventilation module (1-C), with temperature control module (1-D) and with distribution module (1-E); secondary module (2) that can be in the quantity that suits the application and articulated among themselves to conform to the application terrain, with laser modules (2-A), positioned on a mechanical structure and can be in varied quantities in the same secondary module (2) to increase the efficiency of the process, with individual confinement module and laser light guidance (2-B) positioned at any angle of interest with respect to the plant beds and weeds (ED) and consisting of refractive elements (2-B-1) and mirrors (2-B-2), with each element being able to be fixed or mobile, and with user protection module (2-C) and mono, bi, and tri-axial positioning wheels (3). The laser beam leaving the system covers a wide area in order to promote the illumination of at least one focused line, or of a wider area, with at least the same length as the laser.

The constructive configuration for photostimulation of plants (P) has a main module (1) with supply module (1-A), control module (1-B), with compressed gas and/or ventilation module (1-C), with temperature control module (1-D) and with distribution module (1-E); secondary module (2) that can be in the quantity that interests the application and articulated among themselves to conform to the application terrain, with laser modules (2-A), positioned on a mechanical structure and can be in varied quantities in the same secondary module (2) to increase the efficiency of the process, with individual confinement module and laser light guidance (2-B), positioned at any angle of interest in relation to the plant beds, and to the weeds (ED) and consisting of refractive elements (2-B-1) and mirrors (2-B-2), with each element being able to be fixed or mobile, and with user protection module (2-C) and mono, bi, and tri-axial positioning wheels (3). The laser beam leaving the system covers a wide area in order to promote the illumination of at least one focused line, or of a wider area, with at least the same length as the laser.

Figure 5:
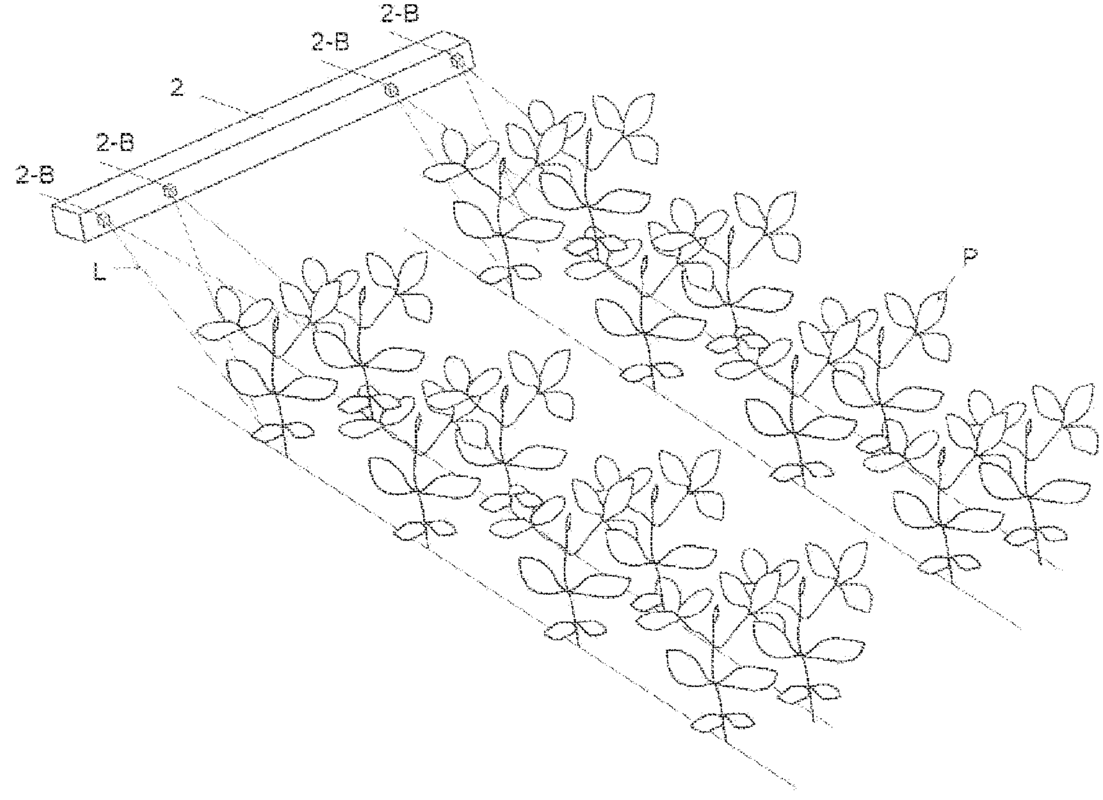
FIG. 5, which shows one of the possible schematic configurations for an example of a plant cutting application, for example, cutting the base of the plant stem in the harvesting process as a replacement for the cutting platforms of harvesters.
Figure 6:
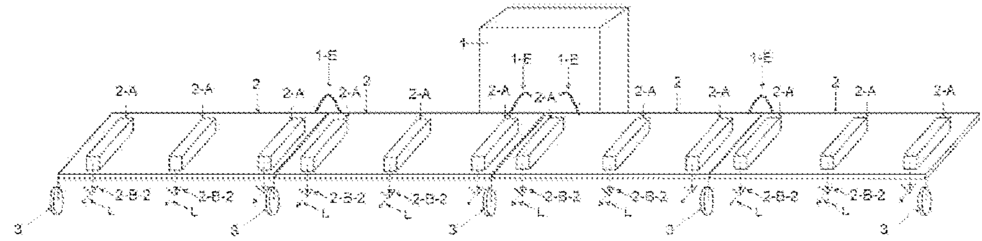
FIG. 6, which shows one of the possible schematic configurations for a plant cutting application example.

The system of the present patent works as follows:

In the case of cutting:

According to FIGS. 5 and 6, during the cutting process, the laser beam (L) is directed through the guide (2-B), and has automatic or manual height adjustment, with or without feedback. The positioning wheels (3) can be moved, automatically or manually, so that they are positioned between the rows of plant beds and do not damage the crop plants (P). Typically, the beam (L) is directed at the base of the plant (P) to perform the cut, but it's not limited to this height (FIG. 5). The cut can be performed in an orthogonal manner to the rows or axially. The cut can be performed with or without the presence of thermal effects, and the laser configuration (2-A) is responsible for this distinction. The system can cut either a single row of plants or numerous rows simultaneously. The function performed by a classic cutting platform of harvesting machines can be performed by laser cutting in substitution of mechanical cutting. With the advantages of reducing the waste of grain generated by the mechanical impact of the blades against the plants, and also increasing the precision of the cuts in terms of height and position of the first crops.

Figure 7:
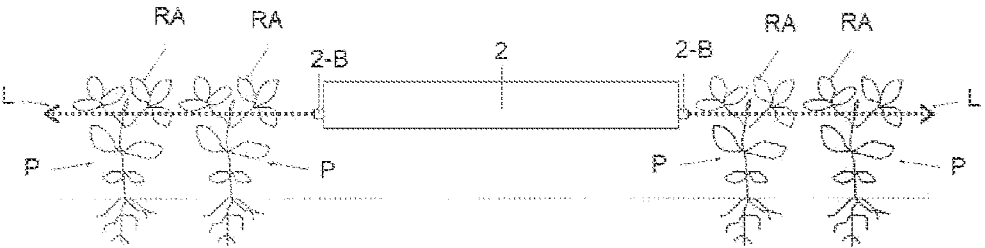
FIG. 7, which shows one of the possible schematic configurations for a plant pruning application example.
Figure 8:
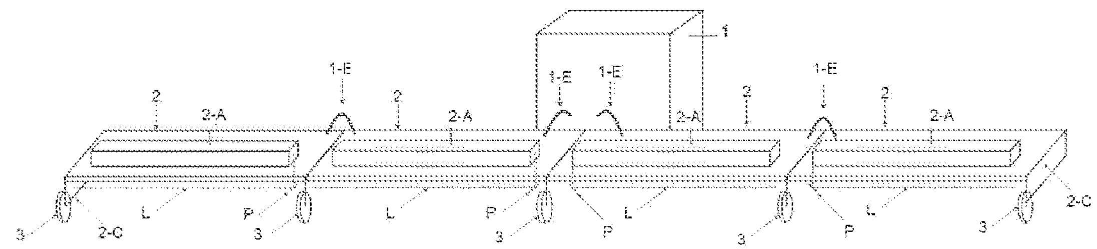
FIG. 8, which shows one of the possible schematic configurations for a plant pruning application example.

According to FIGS. 7 and 8, the specific process of cutting plant structures (P), such as leaves, stem, branches, twigs and apical region (RA), in this case called apical pruning. The pruning in cultivar crops of large extensions, benefits from a cut with vertical position control from the ground (FIG. 7). The vertical control of the height where the cut is made can be adjusted by manual or automatic control, with or without feedback, with or without the aid of sensors. The positioning wheels (3) can be moved, automatically or manually, so that they are positioned between the plant beds rows and do not damage the crop plants (P). The cut is usually made parallel to the ground, but not limited to this angle, and cuts can be made with varied inclinations, and, in the case of more than one laser (2-A), each laser can have its individual vertical height control. The laser beam (L) can also be perpendicular to the movement of the equipment, and consequently perpendicular to the rows, as well as being parallel to them. The system can perform the pruning of only one row of plants or of several rows simultaneously.

Figure 9:
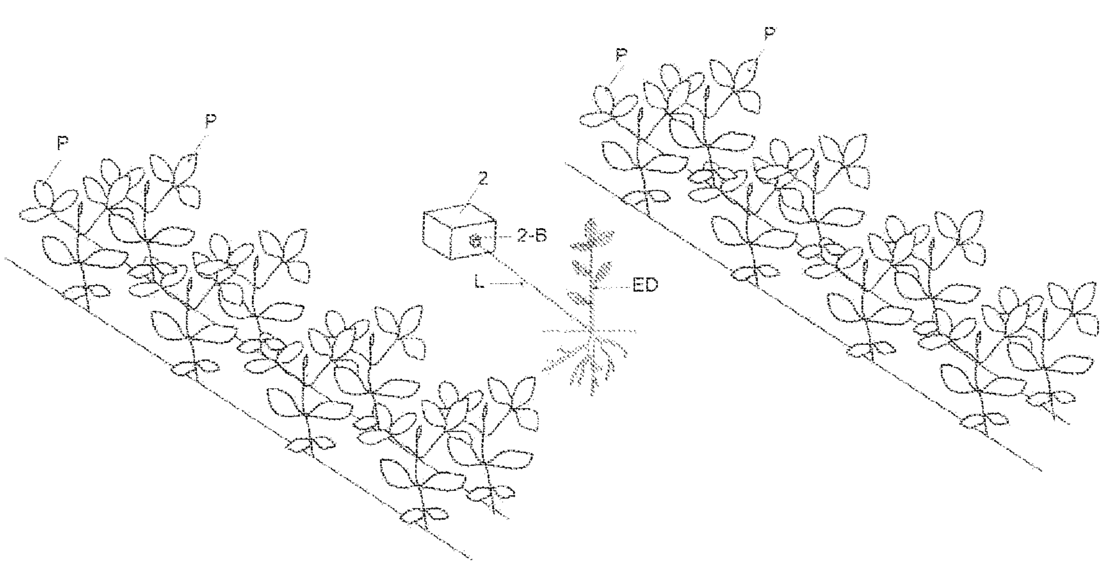
FIG. 9, which shows one of the possible schematic configurations for a plant weeding application example.

In the case of weeding:

According to FIG. 9, when weeding is performed, the laser beam (2-A) is directed, through the guide (2-B), to the regions where it is necessary to perform the cleaning, that is, to remove plant species different from the objective of cultivation (ED), from the same or different rows, or between rows, with the objective of cutting, burning and/or eliminating the invasive or weed species present in the crops. The positioning wheels (3) can be moved, automatically or manually, so that they are positioned between the rows and do not damage the crop plants (P). In this case, cutting processes are employed, with or without thermal effect, to promote the death and subsequent extinction and/or reduction of invasive species (ED). FIG. 9 illustrates the action of the laser on an invasive species between the rows of a crop to cut the stem of the plant near the ground and consequently kill the plant.

Figure 10:
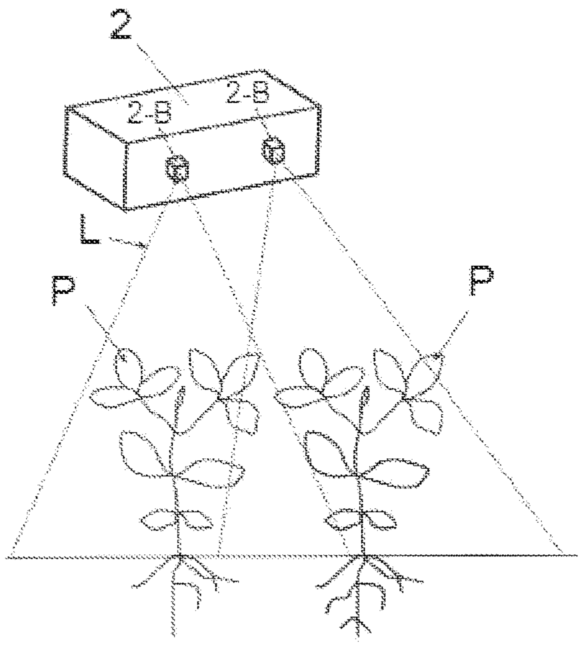
FIG. 10, which shows one of the possible schematic configurations for a plant desiccation application example.
Figure 11:
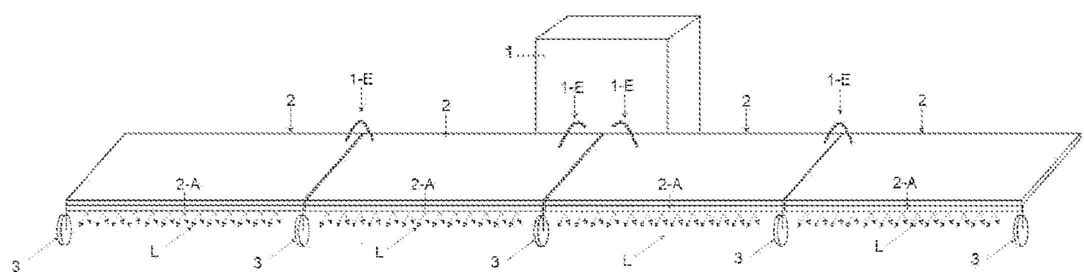
FIG. 11, which shows one of the possible schematic configurations for a plant desiccation application example.

In the case of desiccation:

According to FIGS. 10 and 11, the desiccation procedure employing laser radiation (2-A) does not aim to cause cuts in the plants, or in parts of them, but to irradiate the plant (P) in its entirety, or as much as possible (FIG. 9), and it can be used in only one plant bed, or in many, to promote intense dehydration, leading the plant to death. The positioning wheels (3) can be moved, automatically or manually, so that they are positioned between the beds and do not damage the crop plants (P). The intensity of the laser radiation and the exposure time on the plant, as well as the wavelength, among other parameters of the laser operation regime, will determine whether the final result will be the complete extinction of the plant, as in the case intended for weeds and pests (ED), or to advance the ripening for harvesting.

Figure 12:
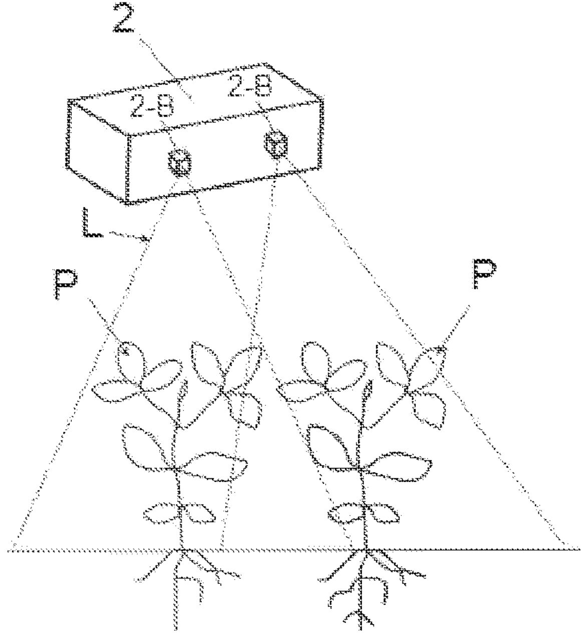
FIG. 12, which shows one of the possible schematic configurations for an example of an application for plant stimulation.
Figure 13:
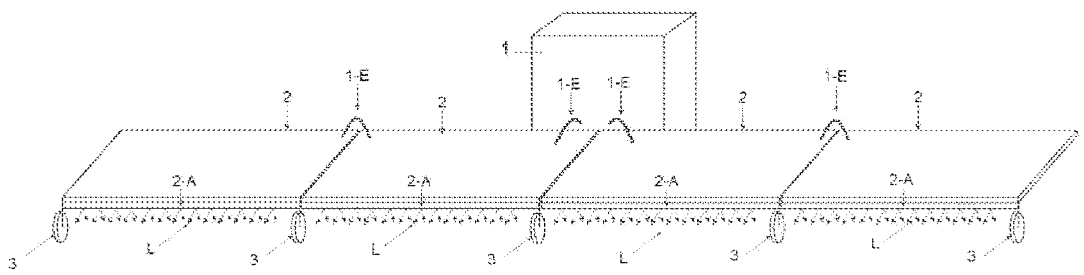
FIG. 13, which shows one of the possible schematic configurations for an example of an application for plant stimulation.

In the case of photostimulation:

According to FIGS. 12 and 13, the stimulation to laser radiation (L) occurs from the irradiation of the plant, in its entirety or in its majority (FIG. 11), favoring the structures responsible for photosynthesis and optical absorption. The laser operating regime (2-A) should promote the action of electronic excitation for stimulation of the plant. The laser radiation (L) reaches the plant (P) in its totality, and may be in only one plant bed row, or in several rows. The intensity, wavelength, modulation, and exposure time, among other variables, of the laser will influence the type of stimulation desired and the species of plant affected. Multiple lasers (2-A) can be used operating in parallel, or a scanning laser, as in the example in FIG. 13, to illuminate as much of the plant or crop as possible. The positioning wheels (3) can be moved, automatically or manually, so that they are positioned between the rows and do not damage the crop plants (P).

The invention claimed is:

1. A laser system operating process for agricultural use, comprising a main module equipped with a power supply module comprising a dedicated combustion electric generator, an electric generator, a battery bank or other photovoltaic system, filters, rectifiers, fuses, circuit breakers, residual circuit breakers, surge protection devices, frequency inverters, power protection and control systems, plus cables and connections; a control module comprising controllers for operating regime, trip, current, voltage, power, polarization, focus, frequency, bandwidth and wavelength; a temperature control module comprising a compressor, a condenser, an evaporator, a heat exchanger, an expansion valve, a ventilation system, thermoelectric pads; a distribution module comprising a set of cables and hoses; a secondary module, which is capable of being replicated and multiplied, providing the system with the ability to expand or reduce a total coverage area, by changing the number of secondary modules connected to the main module, equipped with laser modules, which are capable of being replicated and multiplied in the same secondary module; and a user protection module comprising plates made of acrylic material, glass, metal, wood, or a combination thereof, wherein the plates are barriers to laser light, wherein the power supply module is connected to a power outlet, or auxiliary shaft, of a towing vehicle and bidirectionally connected to the control module, a ventilation module, the temperature control module, and positioning wheels, the control module connected bidirectionally to the laser modules and a laser light guidance, the compressed gas and/or the ventilation module comprising a compressor, reservoir, a filter, a dryer, a pressure gauge, electrical connections, and a gas generating positive pressure, and connected bidirectionally to the laser light guidance; the temperature control module and bidirectionally connected to the laser modules and the laser light guidance; the distribution module bidirectionally connected to the main module, a secondary module, the laser modules, the laser light guidance, and the positioning wheels; the secondary module, with expansion capability in a long structure and articulated between the modules, equipped with the laser module, with expansion capability for several modules in the same secondary module, comprising a solid state light emitting instrument with semiconductors or crystals, comprising one of Nd: YAG, or gas, comprising one of CO and CO2, fiber optics, employing dopants comprising one of Erbium, Ytterbium and Holmium or nonlinear effects or similar ones connected unidirectionally to the laser light guidance; a confinement module and the laser light guidance comprising refractive elements and mirrors with options of arrangements, comprising up to 6 degrees of freedom, 3 linear and 3 rotational, and directs a laser emission to a plant through straight ends emitting at 0 degrees, in "L-shaped" emitting at 90 degrees, in "L-shaped" emitting at any angle $\alpha 1$ (alpha1), in "Z-shaped" emitting at any angle $\alpha 1$ (alpha1), and also with other shapes made by angles $\alpha 1$ (alpha1) and $\alpha 2$ (alpha2); and the positioning wheels comprising horizontal, vertical and rotational positioners, distance detectors and manual and/or automatic mono, bi and tri-axial positioning controllers.

2. The laser system operating process for agricultural use, according to claim 1, comprising a constructive configuration for plant cutting comprising the main module with the power supply module, the control module, with the compressed gas and/or ventilation module, with the temperature control module and with the distribution module, the secondary module with the laser modules positioned on a mechanical structure, with an individual confinement module and the laser light guidance positioned at any angle of interest with respect to plant bed rows, and comprising the refractive elements and the mirrors, with each element being either fixed or mobile, with the user protection module and mono, bi, and tri-axial positioning wheels.

3. The laser system operating process for agricultural use, according to claim 1, comprising a constructive configuration for plant pruning, comprising the main module with the power supply module, the control module, with the compressed gas and/or ventilation module, with the temperature control module and with the distribution module; the secondary module with the laser modules positioned on a mechanical structure, with an individual confinement module and the laser light guidance positioned at any angle of interest in relation to the plant bed rows and comprising the refractive elements and the mirrors, each element being either fixed or mobile, and with the user protection module; and mono, bi, and tri-axial positioning wheels.

4. The laser system operating process for agricultural use, according to claim 1, comprising a constructive configuration for weeding of plants and weeds comprising the main module with the power supply module, the control module, with the compressed gas and/or ventilation module, with the temperature control module and with the distribution module; the secondary module with the laser modules positioned on a mechanical structure, with an individual confinement module and the laser light guidance positioned at any angle of interest with respect to a row of plant beds and weeds and comprising the refractive elements and the mirrors, each element being either fixed or mobile, and with the user protection module; and mono, bi, and tri-axial positioning wheels.

5. The laser system operating process for agricultural use, according to claim 1, comprising a constructive configuration for desiccation of plants and weeds comprising the main module with the power supply module, the control module, with the compressed gas and/or ventilation module, with the temperature control module and with the distribution module; the secondary module with the laser modules positioned on a mechanical structure, with an individual confinement module and the laser light guidance positioned at any angle of interest with respect to plant bed rows and weeds and comprising the refractive elements and the mirrors, each element being either fixed or mobile, and with a user protection module; and mono, bi, and tri-axial positioning wheels.

6. The laser system operating process for agricultural use, according to claim 1, comprising a constructive configuration for photostimulation of plants comprising the main module with the power supply module, the control module, with the compressed gas and/or ventilation module, with the temperature control module and with the distribution module; the secondary module with the laser modules, positioned on a mechanical structure, with an individual confinement module and the laser light guidance positioned at any angle of interest with respect to plant bed rows and weeds and comprising the refractive elements and the mirrors, each element being either fixed or mobile, and with the user protection module; and mono, bi, and tri-axial positioning wheels.

* * * * *